Oct. 12, 1926.  
H. R. STRAIGHT  
1,602,719  
OFF-BEARING MECHANISM FOR TILE CUTTING MACHINES  
Filed April 17, 1923    2 Sheets-Sheet 1
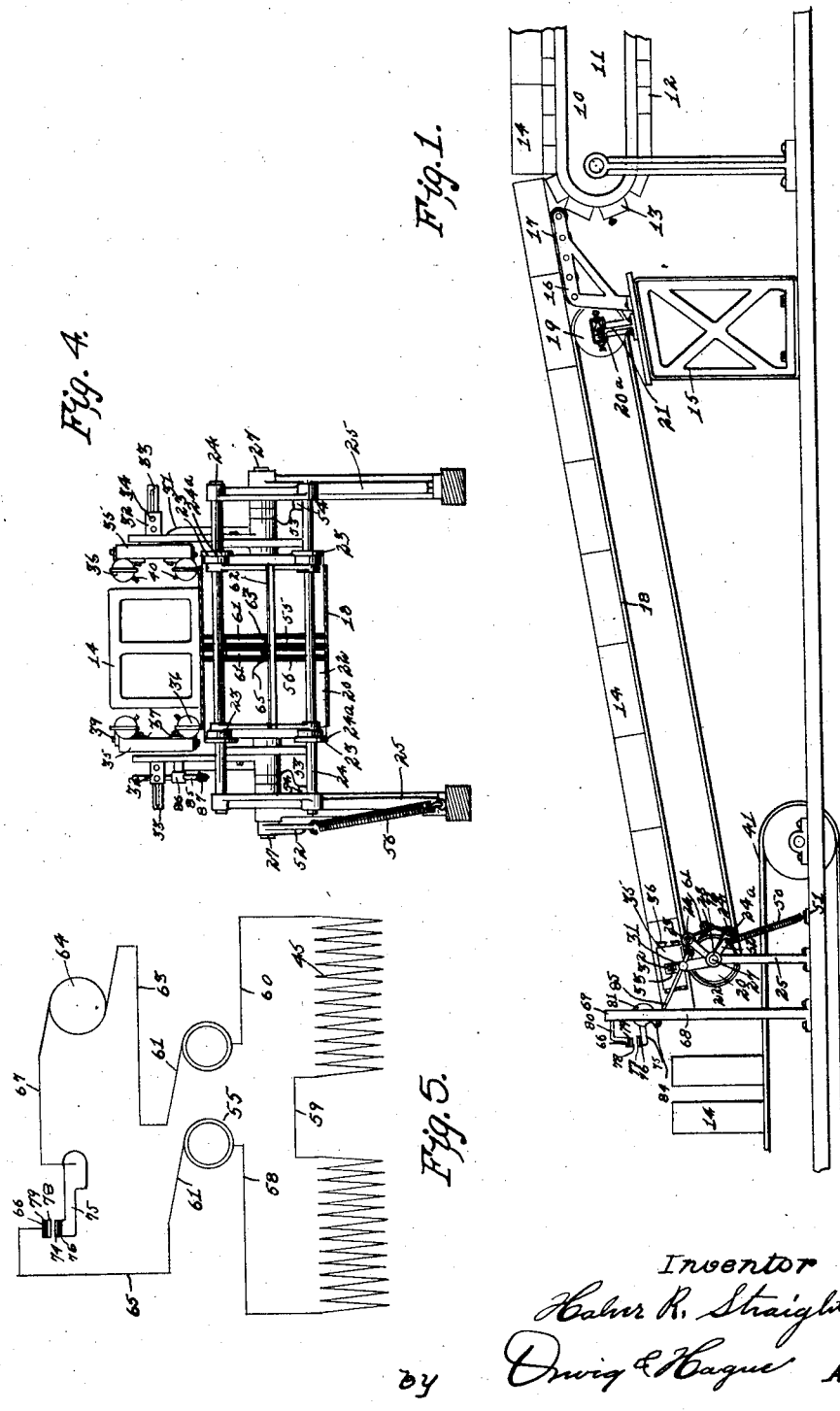

Oct. 12, 1926. 1,602,719
H. R. STRAIGHT
OFF-BEARING MECHANISM FOR TILE CUTTING MACHINES
Filed April 17, 1923 2 Sheets-Sheet 2
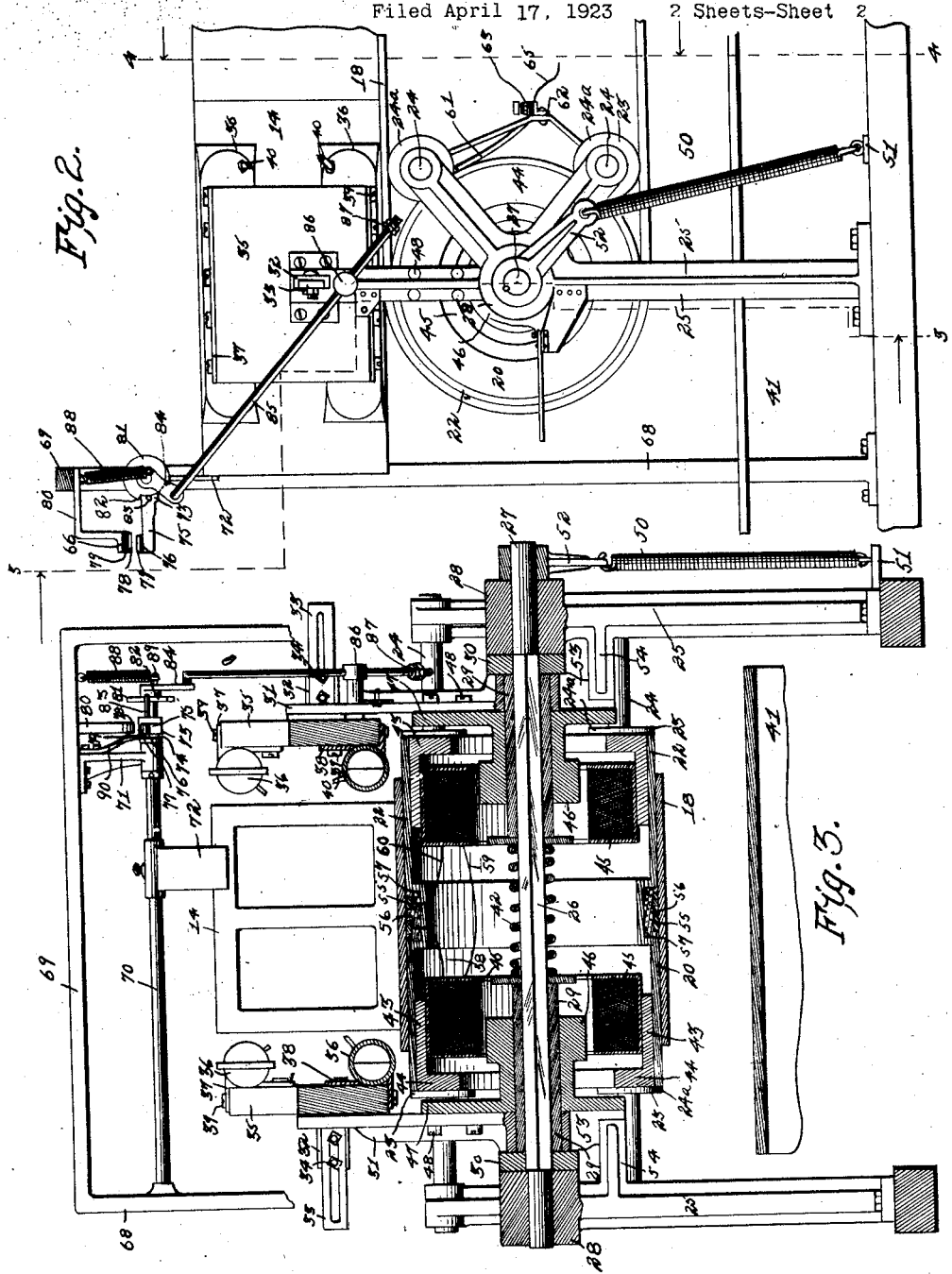
Inventor
Halur R. Straight
by Owing & Hague, Att'ys.

Patented Oct. 12, 1926.

1,602,719

UNITED STATES PATENT OFFICE.

HALVER R. STRAIGHT, OF ADEL, IOWA.

OFF-BEARING MECHANISM FOR TILE-CUTTING MACHINES.

Application filed April 17, 1923. Serial No. 632,683.

The object of my invention is to provide a mechanism of comparatively simple, durable and inexpensive construction which may be located adjacent to the delivery end of a tile cutting machine designed to receive the tile from the said machine and deliver them to a conveyor, which may be a continuously operated conveyor or intermittently operated, the tile being placed on end and spaced a slight distance apart on said receiving conveyor.

A further object is to provide in an off-bearing mechanism for tile cutting machines, new and improved means for gripping the tile as they are delivered from a substantially horizontal position to a second conveyor in a vertical position.

A further object is to provide improved means for operating the gripping mechanism.

My invention consists in the construction, arrangement and combination of the various parts of the device, whereby the objects contemplated are attained, as hereinafter more fully set forth, pointed out in my claims, and illustrated in the accompanying drawings, in which:—

Figure 1 is a side elevation of my improved mechanism showing the same mounted in operative relation with the delivery end of a tile cutting machine.

Figure 2 is an enlarged, detail side elevation of the delivery end of my improved mechanism.

Figure 3 is a transverse, sectional view taken on the line 3—3 of Figure 2.

Figure 4 is a detail, transverse, sectional view taken on the line 4—4 of Figure 2.

Figure 5 is a diagrammatical view of the electric circuit.

The numeral 10 indicates the delivery end of a tile cutting machine of the type ordinarily used in the manufacture of clay products, which comprises a frame 11 having an endless conveyor 12 including a series of transversely arranged slats 13 upon which the tile are received from the tile machine. The slats 13 are of such width that substantially three are required to support a single tile 14. The ends of the tile are even with the outer edges of each group of three slats, as clearly shown in Figure 1.

Arranged adjacent to the delivery end of the conveyor 12 is a support 15 in which is mounted a conveyor frame 16. The said frame has provided therein a series of transversely arranged rollers 17 to form a gravity conveyor. The rollers 17 are comparatively small in diameter so they may be spaced close together, and may be so arranged that the one on the inner end of the frame 16 may lie close to the delivery end of the conveyor 12, so that the blocks 14 may be delivered from the conveyor 12 to the upper end of the conveyor 17.

Adjacent to the lower end of the conveyor 17 is a second endless belt conveyor 18 which is mounted on a roller 19 at its upper end, and a roller 20 at its lower end. The roller 19 is mounted on an axle 20ª, which is adjustably supported by means of uprights 21. The roller 20 comprises a shell 22 which is supported by means of rollers 23 mounted on the transversely arranged shafts 24, the said shafts being rotatively mounted in suitable supporting members 25.

The shafts 24 are located to the rear of the shell 22, and in a plane perpendicular to the longitudinal axis of the conveyor 18 in such a manner that the tension of the conveyor 18 will hold the cylindrical shell 22 in position adjacent to the forward faces of the rollers 23, the said rollers being provided with flanges 24ª to keep the shell in alinement. The conveyor 18 is designed to receive the tile as it is discharged from the conveyor 17 and is operated by the weight of the tile.

Located longitudinally and centrally through the shell 22 is a square shaft 26 having a rounded bearing portion 27 at each end, the said bearing portion being mounted in bearings 28 carried by the supports 25.

Each outer end of the square portion of the shaft 26 is provided with a sleeve 29 which is formed of a non-magnetic material such as bronze or brass. The outer end of each of the sleeves being designed to engage suitable collars 30 which rest against the inner face of the bearings 28. The outer end of each of the sleeves 29 is provided with a gripper supporting arm 31. The said arms are designed to extend substantially upwardly when in a normal position of movement and swing forwardly to a substantially horizontal position. The outer end of each of the arms 31 is provided with a bracket 32, each of which is designed to adjustably receive a slotted bar 33 secured in position by means of bolts 34.

The said bars 33 are arranged horizontally and designed to support on their inner ends a block 35. The width of the said blocks is determined by the vertical width of the tile on the conveyor 18.

The upper and lower edges of each of the blocks 35 are provided with a pneumatic gripping device 36, each of which is formed hollow and cylindrical of resilient material such as rubber, and of a length slightly less than the length of the tile.

Each of the members 36 is provided with flanges 37 and 38, the said flanges extending the full length of the tubular members 36, and the flanges 37 being designed to be secured to the upper and lower edges of the blocks 35, while the flanges 38 are designed to be secured to the inner faces of said blocks. The said flanges are secured in a detachable manner by means of screws 39, so that they may be easily and quickly removed for repair.

Each of the members 36 is provided with a valve stem 40 which is for the purpose of permitting air to be pumped into the tubular members 36 and pressure maintained therein. The valve stem 40 is similar to those used on the ordinary pneumatic tires commonly used on bicycle wheels and automobile wheels. The tubular members are located adjacent to the sides of the blocks, one near the upper edge of the side and the other one near the lower edge of the side of the block, a pair on each side and spaced apart a distance slightly greater than the transverse width of the block so that as the block is moved longitudinally on the conveyor 18, it will pass freely between the members 36 when they are in their normal position of movement.

It will be seen that if the arms 31 are moved inwardly toward each other, which is accomplished by permitting the sleeves 29 to slide longitudinally on the shaft 26, the members 36 will engage the side faces of the block 14 at a point near their lower and upper edges, so that the weight of the said block may be supported as it is delivered from the conveyor 18 to a receiving conveyor 41. The shaft 26 is permitted to rotate until the block has assumed a vertical position, at which time it rests upon the conveyor 41. The arms 31 are moved outwardly by means of a spring 42 on the inner portion of the shaft 26, which has each end engaging the ends of the sleeves 29.

By this arrangement it will be seen that if the arms 31 are moved inwardly toward each other just at the time the block 14 has been moved between them so that the said arms are midway between the said blocks and that the said arms are moved toward each other causing the members 31 to grip the block, that the block may be delivered to the vertical position and to the conveyor 41 without injury to the block.

In this connection it will be seen that it is necessary to apply a retarding or breaking action to the members 31 so that the block may be lowered gradually, and at substantially the same speed of the conveyor 18. To accomplish this I have provided the following mechanism:

Mounted in the ends of the shell 22, which is preferably constructed of non-magnetic material, I have provided cylindrical members 43, each of which has its outer edge provided with an inwardly extending annular flange 44. The members 43 and 44 are formed of magnetic material such as soft iron.

Mounted within the inner ends of the members 43 I have provided coils of conducting wire 45. Mounted on each of the sleeves 29 I have provided a core member 46, the inner end of which is enlarged, while its outer end is provided with a flange 47, said flange being designed to be secured to the arm 31 by means of suitable bolts 48. The operation of this part of my device is as follows:

When the coils 45 become energized by electrical current governed by the circuits and controlling mechanism, which will hereinafter be described, the cores 46 will be drawn inwardly toward each other against the action of spring 42. This will move the sleeves 29 inwardly, and also the arms 31, until the members 36 engage the tile 14. The members 43 and 44 together with the flange 47 it will be seen are in the magnetic field produced by the coils 45, and that the disks 47 will be moved toward the members 44 until they come in contact therewith, after which the members 47 become firmly secured to the members 44, and the arms 31 will be rotated simultaneously with the shell 22, which is in turn rotated by the belt 18 until the blocks have assumed a vertical position, at which time the current is released from the coils 45 and the arms 31 separated by means of the spring 42.

The arms 31 return to their normal position by means of a spring 50, one end of which is secured to a bracket 51 on the main frame of the device, while the opposite end is secured to an arm 52 mounted on the outer end of the shaft 26. The backward movement of the free ends of the arms 31 is limited by a lug 53 from the arm 31 engaging a lug 54 from the supporting members 25.

The device for controlling the current in the coils 45 comprises a pair of circular conducting rings 55 mounted in an annular insulating block 56 mounted in a groove 57 in the central portion of the shell 22. A conductor member 58 connects one of the rings 55 with one of the coils 45, while the two coils are connected together by means of a conductor 59, the current returning to the opposite ring 55 through a conductor 60.

Each of the rings 55 is provided with a contact member 61 mounted on a suitable bracket 62 at the rear of the shell 22. One of the contacts 61 is provided with a conductor 63 leading to a generator 64, while the other is provided with a conductor 65 leading to a switch 66 operatively connected with the generator 64 by a conductor 67. The switch 66 is actuated automatically by the following mechanism.

Mounted in ahead of and opposite each end of the shell 22 is an upright frame 68 having a transversely arranged cross beam 69. Mounted horizontally beneath the beam 69 is a shaft 70, one end of which is pivotally secured in one of the uprights 68, while the opposite end is secured in the downwardly extending bearing member 71.

The central portion of the shaft 70 is provided with a downwardly extending trip device 72 designed to be engaged by the upper edge of the tile 14 when it has reached a predetermined position of movement.

Rotatively mounted on the outer end of the shaft 70 and adjacent to the outer end of the bearing 71 is a hub member 73 which is provided with a groove 74 and a radially extending arm 75. The outer end of the arm 75 is provided with an insulating block 76 designed to carry the contact 77, the said contact being designed to coact with the contact member 78 carried by an insulating block 79, and a stationary arm 80 secured to the member 69.

Secured to the extreme outer end of the shaft 70 is a disk 81 having a notch 82 in its periphery. The said notch 82 is designed to receive a laterally extending pin 83 on one side of the arm 75. The disk 81 is designed to carry a crank 84 pivoted to the connecting rod 85, the lower end of which is slidingly mounted in a shaft 86. The said shaft 86 is rotatively mounted in one of the arms 31.

The lower end of the rod 85 is provided with lock nuts 87 to limit the movement of the rod 85. A spring 88 has one end secured to the beam 69, while the other end is secured to a pin 89 extending outwardly from the crank arm 84. The said pin 89 is so arranged that it may be moved to either side of the dead center between the shaft 86 and the pin 89.

The outer face of the arm 71 is provided with a leaf spring 90, the free end of which is forked and designed to enter the groove 74 of the member 73, in such a manner that the member 73 is frictionally held in engagement with the end of the bearing member 71.

Figures 1 and 2 show the apparatus positioned as it would be when it is inoperative, with the switch arm 75 at its lower limit of movement and the contacts 77 and 78 out of engagement with each other. The lower end of the rod 85 extends through the member 86 a considerable distance.

It will be seen that if the block 14 is advanced forwardly by the belt 18 until its upper edge engages the trip member 72, the shaft 70 will be rotated by said trip member, which in turn will cause the disk 81 to be rotated and carry with it the pins 89 and the connecting rod 85. This movement will continue until the pin 81 passes the dead center of the shaft 70, at which time the said spring will cause the disk 80 to be rapidly rotated, and the trip device 72 to be thrown out of engagement with the block 14, the disk 81 being rotated until the lower edge of the notch 82 engages the pin 83, which pin will cause the arm 75 to be elevated and electric contact made between the contacts 77 and 78 and a circuit established through the coils 45, after which the arms 31 will be rotated carrying with them the block 14 until the block has assumed a substantially vertical position.

As the said arms 31 are rotated, it will be seen that the shaft 86 will travel downwardly along the connecting rod 85 until the said shaft 86 engages the lock nuts 87, which is slightly before the lower end of the block 14 engages the conveyor belt 41. A further movement of the arm 31 causes the connecting rod 85 to be moved longitudinally, which in turn will pull the free end of the crank 84 downwardly and cause the disk 81 to be rotated in an opposite direction, until the upper edge of the notch 82 strikes the pin 83, at which time the arm 75 will be moved downwardly and the contacts 77 and 78 made to disengage each other, breaking the electric circuit through the coils 45, thus permitting the arms 31, together with the members 36 to return to their normal position of movement through the action of the spring 50.

It will be seen that while the pin 83 is between the ends of the notch 82, and prior to the breaking of the contact, due to the pull of the rod 85, the contact members 74 and 73 are retained in contacting relation by the frictional engagement of the arms 73 with the bearing members 71.

By this arrangement it will be seen that blocks may be easily and quickly placed from a horizontal position to a vertical position as they are delivered from the continuously moving conveyor, and that the speed of the gripping or take-off mechanism will be regulated absolutely by the speed of the coveyor upon which the blocks travel. The speed of this conveyor can be regulated by the amount of inclination given to the belt 18.

By mounting the members 36 on the blocks 35, it will be seen that by making said blocks in various widths, tile of different heights may be accommodated by the machine, although in ordinary cases the single set of blocks 35 may be used with several different sizes of tile.

It will further be seen that the device is adapted to also operate on tile of different widths, due to the fact that the members 35 and 36 are adjustably mounted toward and from each other by means of the bars 33.

Thus it will be seen that I have provided a mechanism of simple, durable and inexpensive construction, which is adapted to be used in connection with the cutting mechanism of tile machines, and which will automatically deliver the tile to said cutting mechanism from a horizontal position to a vertical position on a moving conveyor. The said receiving conveyor may be driven at such speed that the blocks will be spaced apart a slight distance, the blocks being removed from the said receiving conveyor either by hand or automatically.

I claim as my invention:—

1. A support, a conveyor mounted therein designed to carry a series of adjacent tile made end to end, said conveyor being mounted on a roller, a pair of gripping members spaced apart and located at each side of the tile as it is advanced on said conveyor, magnetically controlled means for moving said gripping members toward each other and to engage one of said tile when the said tile has reached a certain predetermined position of its movement, magnetic means for causing said gripping devices to move in unison with the said roller in a path concentric with the center of said roller so as to carry the tile from a horizontal position to a substantially vertical position, and means for causing said tile to be released by said grippers when it has reached a substantially vertical position of its movement.

2. A support, a roller on one end of said support, a cylindrical shell on the opposite end of said support rotatively mounted in a plane parallel with the first said roller, a belt for said shell and said roller, a shaft extending centrally and longitudinally through said shell, a pair of arms slidably and rotatively mounted on said shaft, means for yieldably holding said arms to their outer limit of movement, magnetic means for moving said arms toward each other against the action of said yieldable means, gripper members carried by the free ends of said arms and above the upper run of said belt, said grippers being so arranged that when at their outer limit of movement a tile mounted on said belt may move between them, electrical means for operating said magnetic means, means for controlling said electrical means whereby the tile will be gripped when it has reached a predetermined position between said grippers and move from a substantially horizontal position to a vertical position, and means for releasing said tile when it has reached the said vertical position.

3. A support, an endless conveyor carried thereby in substantially a horizontal position, one end of said conveyor being supported by a cylindrical shell and actuated by said endless conveyor, said endless conveyor being designed to receive a series of tile arranged end to end longitudinally with said conveyor, a shaft extending axially through said cylindrical shell, said shaft being rotatively mounted, a pair of sleeves carried by said shaft slidably and non-rotatively mounted thereon, means for yieldably moving said sleeves outwardly from each other, a core carried by each of said sleeves, the outer end of each of said cores being provided with a disk, a cylindrical core member for the outer end of said shell, a coil within each of said cylindrical core members, electrical means for exciting said coil so that a magnetic field is established to pull the said coils toward each other and the said disks into contact with the ends of the cylindrical core members, a radially arranged arm carried by each of said disks and parallel with each other, an inwardly extending gripper member secured to the outer end of each of said arms, automatic means for closing the circuit of said electrical means when a tile has reached a position between said grippers to move the grippers from one position of their movement to another, and means for causing said electrical circuit to to broken when the tile has reached a vertical position of its movement.

4. A support, an endless conveyor carried thereby in substantially a horizontal position, one end of said conveyor being supported by a cylindrical shell and actuated by said endless conveyor, said endless conveyor being designed to receive a series of tile arranged end to end longitudinally with said conveyor, a shaft extending axially through said cylindrical shell, said shaft being rotatively mounted, a pair of sleeves carried by said shaft slidably and non-rotatively mounted thereon, means for yieldably moving said sleeves outwardly from each other, a core carried by each of said sleeves, the outer end of each of said cores being provided with a disk, a cylindrical core member for the outer end of said shell, a coil within each of said cylindrical core members, electrical means for exciting said coil so that a magnetic field is established to pull the said cores toward each other and the said disks into contact with the ends of the cylindrical core members, a radially arranged arm carried by each of said disks and parallel with each other, an inwardly extending gripper member secured to the outer end of each of said arms, means for adjustably mounting said gripper members so that they may be moved toward or from each other relative to said arms, automatic means for closing the circuit of said electrical means when a tile has reached a position between said grippers to move the grippers from one position of their movement to another, and means for causing said electrical circuit to be broken when the tile has reached a vertical position of its movement.

5. In a device of the class described, a gripping mechanism, comprising a pair of blocks spaced apart and parallel with each other, the opposite edges of the inner faces of said blocks each being provided with a pneumatic tube detachably secured thereto, said tubes being spaced apart and parallel with each other, means for supporting the blocks in said parallel positions, and means for moving said supporting means toward and from each other, so that the said tubes may be moved in contact with or made to disengage a tile spaced between them.

6. In a device of the class described, a gripping mechanism comprising a pair of blocks spaced apart and parallel with each other, the opposite edges of the inner faces of said blocks each being provided with a pneumatic tube detachably secured thereto, said tubes being spaced apart and parallel with each other, means for supporting the blocks in said parallel positions, means for moving said supporting means toward and from each other so that the said tubes may be moved in contact with or made to disengage a tile spaced between them, and means for adjustably supporting said blocks toward or from each other relative to said supports.

7. In a device of the class described, a gripping member comprising a pneumatic tube having a flange extending longitudinally with said tube and tangentially with the outer face, a second flange perpendicular to the first said flange, and means provided whereby said tube may be inflated.

8. In combination with the delivery end of a tile cutting machine, a support, a conveyor carried by said support and in alinement with the discharge end of said cutting machine, said conveyor comprising a series of transversely arranged rollers placed in a slightly downwardly inclined plane, an endless conveyor adjacent to the lower end of said conveyor, said endless conveyor being designed to receive material from said conveyor, a horizontally arranged conveyor beneath the discharge end of said endless conveyor and in alinement therewith, a member rotatively mounted within said endless conveyor at a fixed speed therewith, means controlled by the last said member for gripping blocks carried by the said endless conveyor and delivering them to the said horizontally arranged conveyor from a substantially horizontal position to a vertical position.

9. In combination with the delivery end of a tile cutting machine, a support, a conveyor carried by said support and in alinement with the discharge end of said cutting machine, said conveyor comprising a series of transversely arranged rollers, an endless conveyor adjacent to the delivery end of said conveyor, said endless conveyor being designed to receive material from said conveyor, a horizontally arranged conveyor beneath the discharge end of said endless conveyor and in alinement therewith, means controlled by the movement of said endless conveyor for gripping blocks carried by the said endless conveyor, and delivering them to the said horizontally arranged conveyor from a substantially horizontal position to a vertical position.

10. In a device of the class described, a gripping mechanism comprising a pair of spaced blocks, substantially parallel with each other, each of said blocks being provided with a pneumatic gripping member, means for moving said gripping members toward and from each other so that they may be moved in contact with or made to engage a tile spaced between them.

11. A support, a roller, an endless conveyor mounted on said roller and designed to carry a series of adjacent tile laid end to end, a second conveyor adjacent to the delivery end of said endless conveyor, a pair of gripping members spaced apart and located at each side of the tile as it is advanced on said endless conveyor, means for moving said gripping members toward each other to engage one of said tile when the said tile has reached a certain predetermined position of its movement, means for causing said gripping devices to be moved in unison with said roller, in a path concentric with the center of said roller, and to carry the tile from a horizontal position from the first said conveyor to a substantially vertical position on the second said conveyor, and means for causing said tile to be released by said grippers as they engage the said second conveyor.

12. In a device of the class described, an endless conveyor designed to receive material from a tile cutting machine, a horizontally arranged conveyor beneath the discharge end of said endless conveyor and in alinement therewith, means controlled by the movement of said endless conveyor for gripping blocks carried thereby, and delivering them to said horizontally arranged conveyor from a substantially horizontal position to a vertical position.

Des Moines, Iowa, March 31, 1923.

HALVER R. STRAIGHT.